Figure 1:
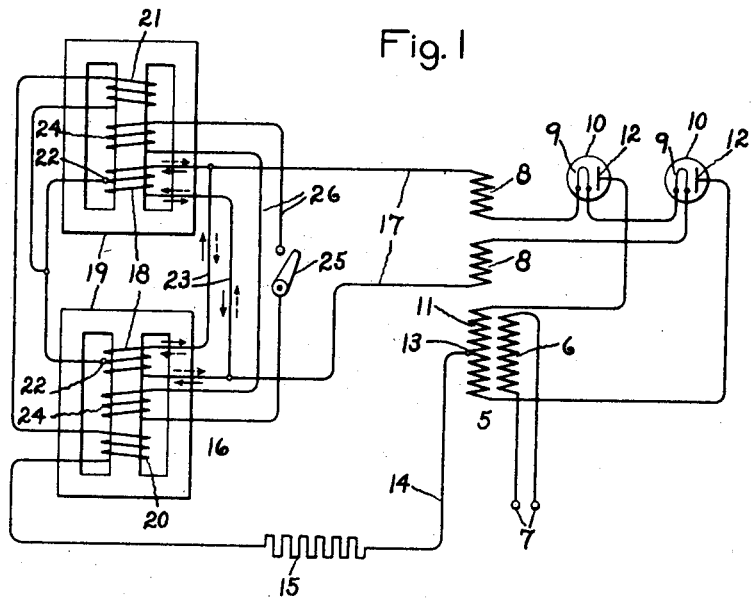

June 2, 1931.  W. W. BROWN  1,808,522
PROTECTIVE REGULATING MEANS FOR ALTERNATING CURRENT RECTIFIER
Filed Aug. 29, 1928

Inventor:
William W. Brown,
by Charles E. Tullar
His Attorney.

Patented June 2, 1931

1,808,522

UNITED STATES PATENT OFFICE

WILLIAM W. BROWN, OF SCHENECTADY, NEW YORK, ASSIGNOR TO GENERAL ELECTRIC COMPANY, A CORPORATION OF NEW YORK

PROTECTIVE REGULATING MEANS FOR ALTERNATING CURRENT RECTIFIER

Application filed August 29, 1928. Serial No. 302,779.

The present invention relates to protective regulating means for alternating current rectifiers employing hot cathode electric discharge devices.

As is well known, the regulation characteristic of such rectifiers is relatively poor, the voltage supplied thereby to the load usually being subject to wide variations between the full load and the no load operating conditions, and in the case of the latter the voltage may rise to an excessively high and dangerous value. Hence a low load and particularly a no load condition of operation is undersirable and to be guarded against in order to prevent the application of excessively high voltages to apparatus connected with the load or output circuit of the rectifier.

It is therefore the object of the present invention to provide an improved protective regulating means and circuit for preventing excessively high voltage output from an alternating current rectifier employing hot cathode electric discharge devices, when for any reason the load is reduced below a predetermined low value or entirely lost, as by accidental opening of the load circuit, for example.

In carrying out the invention, iron core transformers or choke coils are employed as the regulating means with windings thereon suitably arranged so that a variation of direct current in certain of the windings will vary the inductance of alternating current windings on the same core. This principle of control is described in Letters Patent of E. F. W. Alexanderson, No. 1,206,643.

As described in the above-named patent, the direct-current control windings are arranged and connected in such a manner that induced alternating voltage will not appear on the terminals of said windings, that is, no alternating current will be induced in the control circuit.

This arrangement meets one of what are considered to be the main requirements of the protective regulating means and circuit contemplated by the present invention. These requirements may be designated as follows:—

1. The control windings should be so arranged that alternating induced voltage will not appear on the terminals thereof, that is, the effects of induced voltage will not appear in the control windings as above mentioned.

2. The double frequency or second harmonic of the alternating current produced by distortion of the flux by the controlling direct current should be short circuited in such a manner that the double frequency will not appear in the associated circuits.

3. The rectifier action should be capable of being started by closing a low voltage circuit until the rectified current builds up in the control windings, thereby preventing starting of operation under any condition until this low voltage circuit is closed.

4. A symmetrical arrangement of inductances and windings should be provided in the cathode circuit of the rectifier for eliminating ripple in the output.

5. The control apparatus should be such that the operation is stable and accumulative above a certain subnormal value of load current and unstable and disseminating below that value.

With these requirements in mind, the invention will be better understood from the following description when considered in connection with the accompanying drawings, and its scope will be pointed out in the appended claims.

Figure 2:
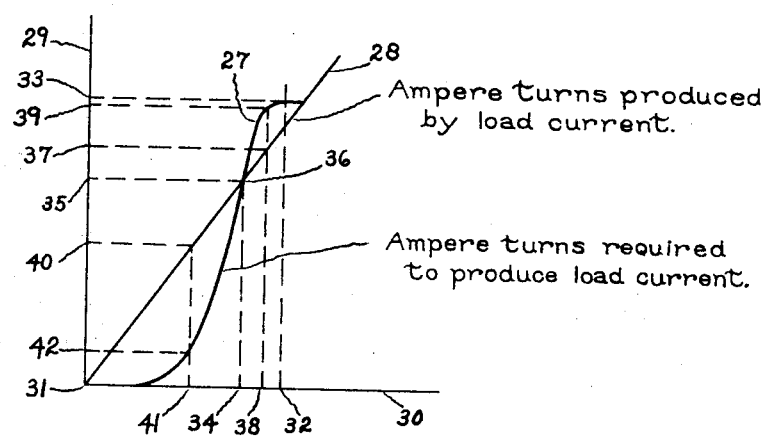

In the drawings, Fig. 1 is a wiring diagram of an apparatus embodying the invention, being by way of example a common type of full wave rectifier provided with a protective regulating means and circuit in accordance with said invention, and Fig. 2 is a curve diagram illustrating the operation of the apparatus of Fig. 1.

Referring to Fig. 1, 5 is a transformer provided with a primary 6 connected with alternating current supply terminals 7, with secondaries 8 connected with the cathodes or filaments 9 of electric discharge devices or rectifier tubes 10, and with a secondary 11 connected with the anodes 12 of the rectifier tubes and having the common center tap 13 connected with a load or output circuit 14 in which the load is represented by a resistor 15. The load circuit is completed through protective regulating means or apparatus indicated at 16 to the cathodes 9.

The apparatus above described, omitting the regulating means 16, is a well known rectifier and connected load arrangement, and represents any suitable apparatus of this character employing hot cathode rectifier tubes, the cathode or filament excitation of which may be controlled.

In accordance with the invention, the filament excitation of the rectifiers is controlled by the load current, a normal load current causing full excitation of the filaments and normal operation thereof, while a reduction in load current below a certain lower value causes the filament excitation to be reduced to zero. This provides a protective regulation which reduces the output of the rectifier to zero with an excessive reduction in or loss of load, thereby protecting the load or output circuit from the effects of high or excessive voltages.

To effect this protective regulation in the cathode heating or filament circuit of the rectifier tubes, indicated at 17, is connected a pair of alternating current windings 18, said windings being connected in parallel and in the present example being wound on separate cores 19 of suitable magnetic material, such as soft iron or steel. These windings provide reactance choke coils in the cathode circuit, the inductances of which are controlled by direct current saturating or control windings 20 and 21 wound each on the same core with one of the reactance windings. The control windings are connected in series and in opposition in the load or output circuit of the rectifier which is returned to the cathode circuit 17 through center taps 22 on each reactance choke winding 18.

With no load current flowing in control windings 20—21, the reactance of choke windings 18 is made such that the filament excitation current of rectifier tubes 10 is reduced practically to zero, while with full or normal load current the reactance of windings 18 is reduced to a low value such that normal filament excitation is permitted to flow therethrough.

The control windings 20 and 21 in the load circuit are preferably equal and equally coupled with the reactance windings 18 and when connected in opposition, as indicated in the drawings, the voltages induced therein from the reactance windings 18 do not appear on the load circuit, thus meeting the first requirement mentioned hereinbefore. Any suitable arrangement of these windings providing equal induced voltages in opposition may be utilized however.

The shunt circuit formed by the parallel connected reactance windings form a short circuiting path for the double frequency or second harmonic currents which would otherwise flow in the filament or cathode circuit. The path of these currents is indicated in Fig. 1 by the dotted and full arrows along the shunt circuit connections 23. This arrangement thus meets the second requirement as hereinbefore mentioned.

The starting of the rectifier is effected by means of short circuiting windings 24 wound on the different cores and arranged to be connected in series through a switch 25 which is closed to start the rectifier. When switch 25 is closed, a circulating current induced from windings 18, builds up in the closed circuit 26 and lowers the impedance of windings 18 permitting filament current to build up in the rectifier tubes 10 to normal value. The rectified load current then established holds the reactance of windings 18 in the normal operating conditions and starting switch 25 may then be opened. The starting or tertiary windings 24 are so proportioned that the voltage across the starting switch is relatively low. Switch 25 may be of any suitable type capable of carrying the starting current and may be operated manually or by any suitable means.

In meeting the fourth requirement hereinbefore mentioned, the filament lighting secondaries 8 are connected in series with the filaments 9, one secondary on each side of the series connected filaments and the parallel connected reactance windings 18 are connected between said secondaries. The load circuit is then connected with the filament circuit at substantially the electrical center of each reactance winding as indicated by center taps 22. The filament secondaries 8 and windings 18 are then electrically symmetrically arranged with respect to the load current. Any other suitable symmetrical arrangement for this purpose may however be used and any other suitable means for returning the load circuit to substantially the electrical center of each reactance winding may also be used, although the arrangement shown is that which is at present preferred.

The control characteristic covered by the fifth requirement hereinbefore mentioned, depends upon the relation between the load current and the filament excitation of the rectifiers. It will be seen that according to the value of the load current the reactance condition of choke windings 18 may be carried from a low reactance value which permits normal filament excitation and normal load current to a high reactance value which permits no appreciable filament excitation and no appreciable load current or output voltage in case the load circuit is opened for any reason. In other words, if the load current is reduced, the filament excitation is correspondingly reduced, and if the filament excitation is reduced to zero value a reduction of the output of the rectifier to zero is produced.

With the control arrangement of the present invention, the relation between the rectifier output or load current and the current or ampere turns in the control winding is such that within a certain range of loads the regulating or control means tends to build up the load current to normal value, that is, the regulating means has a stable or accumulative action. Below this range of loads the control means tends to reduce the load current to zero, that is, the regulating means has an unstable or disseminating action.

This accumulative and disseminating action may be explained with reference to Fig. 2 in which curves 27 and 28 are plotted between load current along the ordinate 29 and ampere turns along the abscissa 30, with the origin at 31.

Curve 27 shows the relation between load or rectified current and the ampere turns required in control windings 20 and 21 to permit that load current to flow, this curve being plotted by separately exciting the control windings 20 and 21. Normal operation is obtained with the control ampere turns at a value 32 which holds the reactance choke windings 18 in the normal low impedance condition, permitting normal rectified load current of the value 33. Lowering the control ampere turns, as by lowering the control current, to a value 34 increases the impedance of windings 18 and results in a load current of the value 35. It will be seen that with the circuit connection of Fig. 1 and with the load current providing the control current and effecting the variation in ampere turns, that if the load circuit is opened the removal of control excitation in windings 20 and 21 will cause the impedance of windings 18 to rise to the high value, lowering the filament excitation to practically zero and thereby preventing an objectionable and high open circuit voltage in the output or load circuit. Furthermore, if the load circuit is then closed the normal operating condition will not be effected until the starting circuit 26 is closed by switch 25 as hereinbefore explained. This prevents accidental operation of the rectifier in case the load circuit is closed before the open circuit condition is permanently corrected. A similar starting operation is required when the supply to primary 6 is cut off for any reason.

It is essential, however, that the protective regulating means completely remove the rectified current and corresponding voltage even if the load circuit changes only reduce and do not completely remove the rectified current or if the supply is reduced in voltage sufficiently to reduce the load current to a low value.

It has been found that the control means and circuit arrangement shown meet this requirement, having a disseminating range below a certain subnormal load current while at the same time being stable and having an accumulative range above said value of load current. The disseminative and accumulative action will be clear from a consideration of curve 28 in connection with curve 27.

Curve 28 plotted to the same scale as curve 27 shows the relation between load current and the ampere turns produced by it. It will be seen that a point 36 is common to both curves. The load current 35 at this point according to curve 28 is thus sufficient to maintain the ampere turns required according to curve 27 to permit that value of load current to flow. Thus stable operation results.

If now the load current increases for any reason, as by decrease in the resistance of the load 15 to a value for example as indicated by a point 37, then according to curve 28 ampere turns of a value indicated by point 38 will be produced. This value of ampere turns according to curve 29 will permit load current of a value 39 to flow and if the load circuit then permits, the load or rectified current will rise toward this value and continue to accumulatively increase to the maximum or normal value 33. Thus in the range at and above a rectified or load current value 35 the regulating action is stable, and also accumulative above point 35. The rectified or load current may therefore vary in the range 35 to 33 without stopping the rectifier action, automatically returning to normal if the load circuit permits it to do so. This range of action thus permits the load to vary within safe working limits without setting up excessively high output voltages. Such load variations may be caused by variations in the resistance of the load circuit or in the voltage of the supply.

If the load current decreases below point 35 to a value such as indicated at 40 for example, then according to curve 28, the ampere turns produced by it are indicated at point 41. This value of ampere turns according to curve 27 is sufficient to maintain a load current of a value indicated by point 42. Hence the load current will tend to fall to this value and continue to decrease to zero.

Thus the combined protective regulating characteristics are such that when the rectified or load current is reduced from 33 to 35 with corresponding reduction in control excitation from 32 to 34, the operation is stable and immediately accumulative to return the rectified or load current to normal when load circuit conditions permit. A further reduction of rectified or load current below this lower than normal value causes a further reduction in the control excitation and this disseminating effect causes the rectified or load current to drop to zero. Operation can then be resumed only by closing the starting circuit after the cause of this operating condition has been investigated and corrected. Thus the means and circuit shown come within the fifth and last requirement above mentioned.

It will be appreciated that the reduction in load current may be caused by an open circuit or partial loss of load or partial or complete loss of supply voltage. Hence the regulating means protects against further operation under abnormal conditions whether from loss of load or supply voltage and restores the operation to normal when permissible variations occur in either the load current or supply voltage above a certain subnormal value.

While the invention has been illustrated and described in connection with a full wave rectifier apparatus, it should be understood that it is not limited thereto and that it may be carried out in connection with other apparatus embodying hot cathode electric discharge devices for controlling the output therefrom and protecting associated circuits and apparatus from excessive voltage or surges caused by interruption of or wide variations in the supply voltage.

What I claim as new and desire to secure by Letters Patent of the United States, is:

1. In an electrical apparatus, the combination with a hot cathode rectifier, of a reactance winding connected in the cathode circuit thereof and means inductively coupled with said winding for regulating the cathode excitation in response to changes in load current from said rectifier, said means being operative to render the load current stable within a certain range of loads and unstable at other loads.

2. The combination of rectifying means provided with cathode heating and anode circuits, means for controlling the impedance of said cathode heating circuit in accordance with the current in said anode circuit, and starting means operable to control said impedance independently of said anode current.

3. The combination of rectifying means provided with cathode heating and anode circuits, means for controlling the impedance of said cathode heating circuit in accordance with rectified load current in said anode circuit, said means being operative to render the rectified current stable within a certain range of loads and unstable at other loads, and starting means operable to control said impedance independently of said anode current.

4. The combination with an electric discharge device having an anode and a cathode, of a cathode heating circuit, a load circuit connected with said anode, a pair of parallel connected reactance choke coils in the cathode heating circuit, and means for varying the impedance of said choke coils in response to changes in current flow in said load circuit.

5. The combination with an electric discharge device having an anode and a cathode, of a cathode heating circuit, a load circuit connected with said anode, a pair of parallel connected reactance choke coils in the cathode heating circuit, and means associated with said choke coils for varying the impedance thereof inversely with variations in current in the load circuit.

6. The combination with an electrical apparatus including a hot cathode rectifier provided with cathode heating and anode output circuits, of a pair of parallel connected choke coils providing a normally high impedance in the cathode heating circuit, and means for reducing the impedance of said choke coils in response to increased anode current flow.

7. The combination with an electrical apparatus including a hot cathode rectifier provided with cathode heating and anode output circuits, of a pair of parallel connected choke coils providing a normally high impedance in the cathode heating circuit, and a direct current winding for reducing the impedance of said choke coils in response to increased anode current flow, said winding being arranged to produce an accumulative increase in anode current throughout a higher range of anode current values and to produce a disseminating reduction therein throughout a lower range of anode current values.

8. The combination with an alternating current rectifier having a hot cathode rectifier tube and a load circuit for receiving the rectified current therefrom, of means for protecting the load circuit from excessive voltage resulting from abnormal load reduction and open circuit therein, said means comprising an alternating current cathode supply circuit for the rectifier tube, a pair of parallel connected high impedance choke coils in said circuit, and control windings each magnetically coupled with one of said choke coils, said windings being oppositely connected in series with one another in said load circuit for reducing the impedance of the choke coils to a low value with normal load current flow and being so related to said choke coils that the latter are permitted to resume the high impedance condition when load current below a certain subnormal value flows in said windings.

9. The combination with an alternating current rectifier having a hot cathode rectifier tube and a load circuit for receiving the rectified current therefrom, of means for protecting the load circuit from excessive voltage resulting from abnormal load reduction and open circuit, said means comprising an alternating current cathode supply circuit for the rectifier tube, a pair of parallel connected high impedance choke coils in said circuit, control windings each magnetically coupled with one of said choke coils, said windings being oppositely connected in series with one another in said load circuit for reducing the impedance of the choke coils to a low value with normal load current flow and being so related to the choke coils that the latter are permitted to resume the high impedance condition when load current below a certain subnormal value flows in said windings, a third winding magnetically coupled with each choke coil, and means for short circuiting said third windings to reduce the impedance of said choke coils to the low impedance condition to start the rectifier.

10. The combination of rectifying means provided with cathode heating circuit and a load circuit for receiving rectified current, said cathode heating circuit being connected with the load circuit and including alternating current exciting windings and reactance windings, said reactance windings being substantially equal and being connected in parallel, control windings associated with said reactance windings and connected in opposition in the load circuit, said exciting and reactance windings being arranged symmetrically in the cathode heating circuit with respect to its connection with the load circuit.

11. The combination of rectifying means provided with cathode heating and anode circuits, and means for controlling the impedance of said cathode heating circuit in accordance with rectified load current in said anode circuit, said means being operative to render said load current stable within a certain range of loads and unstable at other loads and including a reactance winding in the cathode heating circuit and a second winding associated therewith and connected in the anode circuit.

In witness whereof, I have hereunto set my hand this 28th day of August, 1928.

WILLIAM W. BROWN.